United States Patent [19]

Jackson et al.

[11] 4,272,005
[45] Jun. 9, 1981

[54] EXPLOSIVE CLADDING

[75] Inventors: Peter W. Jackson, Whitley Bay, England; David K. C. Anderson, Troon; David B. Cleland, Stevenston, both of Scotland

[73] Assignee: Imperial Chemical Industries Limited, London, England

[21] Appl. No.: 3,515

[22] Filed: Jan. 15, 1979

[30] Foreign Application Priority Data

Jan. 17, 1978 [GB] United Kingdom ............... 1850/78

[51] Int. Cl.³ .............................................. B23K 20/08
[52] U.S. Cl. .................................. 228/107; 228/175
[58] Field of Search ............... 228/107, 108, 109, 175

[56] References Cited

U.S. PATENT DOCUMENTS

| 3,258,841 | 7/1966 | Popoff | 228/108 |
| 3,732,612 | 5/1973 | Simon | 228/108 |
| 3,987,952 | 10/1976 | Wittman et al. | 228/108 X |

FOREIGN PATENT DOCUMENTS

| 655943 | 3/1965 | Belgium | 228/107 |
| 2038065 | 4/1971 | Fed. Rep. of Germany | 228/175 |
| 986435 | 3/1965 | United Kingdom | 228/175 |
| 1318383 | 5/1973 | United Kingdom | |

*Primary Examiner*—Kenneth J. Ramsey
*Attorney, Agent, or Firm*—Cushman, Darby & Cushman

[57] ABSTRACT

A method of applying a surface layer across a surface layer or joint between cladding layers on a clad metal plate or plates comprises forming a shallow chamfer along each opposing cladding layer edge and positioning over the said chamfers a corrosion resistant metal flyer-plate having a shallow generally V-shaped configuration, optionally applying a buffer layer of transmitting medium placed on the outside surface of the flyer-plate, further superimposing an explosive layer upon the cladding and buffer layers and detonating the explosive layer so as to weld the flyer-plate material at least to the cladding layers. Advantageously a metal groove may be formed in the base metal layer of the clad plate to facilitate positioning of the flyer-plate, the groove wall conveniently being extensions of the cladding chamfer surfaces. The method facilitates an assembly of a cladding strip and explosive layer over a joint between clad metal plates in any orientation and gives joints of high quality between the cladding layers on the plates.

13 Claims, 7 Drawing Figures

EXPLOSIVE CLADDING

IMPROVEMENTS IN AND RELATING TO EXPLOSIVE CLADDING

This invention relates to explosive cladding of structural metal members by a corrosion resistant metal layer and is particularly, although not exclusively, applicable to strip cladding across regions of fusion welded joints between two or more clad plates.

There is an increasing use of corrosion resistant clad plate in the construction of vessels and structures for use in corrosive environments such as those experienced in chemical plant. The plate employed is usually steel, clad with a relatively thin layer of corrosion resistant metal such as, for example, titanium, and since it is not normally possible to fusion weld this layer to the base metal it is usually formed by explosive welding. The technique of forming this material is well known in the art.

When large vessels are to be constructed it is often necessary to join two or more such clad plates together and this presents difficulties since it is not possible to fusion weld the complete clad plates. Thus to fabricate butt joints between titanium clad steel plates it is necessary to machine off the titanium cladding for a small distance so that fusion welding of the steel plates may then be effected without interference from the titanium cladding layer. It is then necessary to repair the gap in the titanium cladding to restore the corrosion resistant layer. One known method is described in a Paper entitled "Explosion Clads" by A H Holtzman—Proceedings of Seminar of NATO Advanced Study Institute on High Energy Rate Working of Metals—Oslo 1964, page 512. This method involves the use of a silver, titanium or copper insert which is laid within the gap and then bridged by an overlaid strip of titanium which is fusion welded to the titanium cladding along each side of the joint region. The insert acts as a filler material to prevent fatigue failure of the titanium strip and attendant welding. Similar techniques are employed for joining clad plate made in other such metallurgically incompatible combinations such as tantalum/steel and zirconium/steel.

This solution is expensive due to the cost of the insert employed and the high degree of welding skill required to perform the joint.

It has also been proposed in United Kingdom Patent Specification No. 986,435 to explosively weld a corrosion resistant layer across a fusion welded zone in clad metal plate by assembling over the fusion welded zone a strip of cladding metal and an overlying layer of explosive material and detonating the explosive along one edge. For best results the cladding strip was disposed at an angle to the clad metal base plate but the assembly is difficult to assemble accurately and the resultant weld is not uniform over the fusion welded zone.

The object of this invention is to provide a less expensive, convenient method of surface cladding joints between clad metal plates which produces a high integrity weld.

In accordance with the present invention a method of applying a surface layer across a surface layer or joint between cladding layers on a clad metal plate or plates comprises forming a shallow chamfer along each opposing cladding layer edge and positioning over the said chamfers a corrosion resistant metal flyer-plate having a shallow generally V-shaped configuration, optionally applying a buffer layer of transmitting medium placed on the outside surface of the flyer-plate, further superimposing an explosive layer upon the flyer-plate or buffer layers and detonating the explosive layer so as to explosively weld the flyer-plate material at least to the cladding layers.

The optimum angles of the chamfers and the flyer-plate legs relative to the clad base plate for optimum welding may be calculated by known methods described, for example, in the following papers:

Papers by H K Wylie, P E G Williams and B Crossland entitled "An Experimental Investigation of Explosive Welding Parameters"—Proceedings of the first Symposium on the use of Explosive Energy in Manufacturing Metallic Materials of New Properties, Marianske Lazne, 1970, published by the Institute of Industrial Chemistry, Pardulice, Czechoslovakia and "Further Experimental Investigation of Explosive Welding Parameters"—Proceedings of the Third International Conference of the Center for High Energy Forming, Denver, Colo. 1971.

Paper by R H Wittman—Proceedings of the Second Symposium on Explosives Working of Metals at Marianske Lazne, 1973, Pages 153–167.

Paper entitled "Some Aspects of Explosive Welding in Different Geometries" by M D Chadwick—Proceedings of The Welding Institute Select Conference on Explosive Welding, Hove 1968.

In some cases it is advantageous to form a groove in the base metal layer of the clad plate centrally between the chamfered edges of the cladding layers, in order to facilitate positioning of the flyer-plate. The groove may conveniently be formed simultaneously with the chamfers of the cladding layers and effectively extends the chamfer surfaces.

The invention is preferably applicable to the joint region of clad metal plates where two base metal plates have been fusion welded together.

The flyer-plate may advantageously have integral extensions which become detached by the explosion, whereby high quality welds up to the flyer-plate edge are achieved. The extensions are conveniently defined by longitudinal grooves formed at the commencement of the extensions or by bending the extended flyer-plate along a line at the commencement of the extension in a direction outwardly from the base plate.

In a further modification each leg of the flyer-plate is provided with a pair of angled portions to provide for a partial weld to occur to the base or target as well as the cladding portions.

The flyer-plate may be spaced apart from the base or target plate in order to modify the explosive weld between the flyer-plate and the base plate.

Preferably a plastic explosive, such as Metabel, (Registered Trade Mark) having a high detonation velocity is employed in the form of a flexible sheet.

Other features of the invention will become apparent from the description which follows of three specific embodiments.

The invention will now be described, by way of example only, with reference to the accompanying drawings in which FIG. 1 shows a diagrammatic cross-section of one embodiment in accordance with the invention;

In the drawings like elements are designated by the same numeral.

In the embodiments shown in FIGS. 1-6 the invention is applied to the fusion butt weld region joining two flat steel base plates 1 and 1A. The cladding layers 2, 2A are machined back for a short distance from the weld region to prevent interference with the fusion welding process and shallow chamfers at an angle $\beta$ are machined on the exposed ends of the cladding layers 2, 2A adjacent to the subsequently formed fusion weld zone 6.

Figure 1:
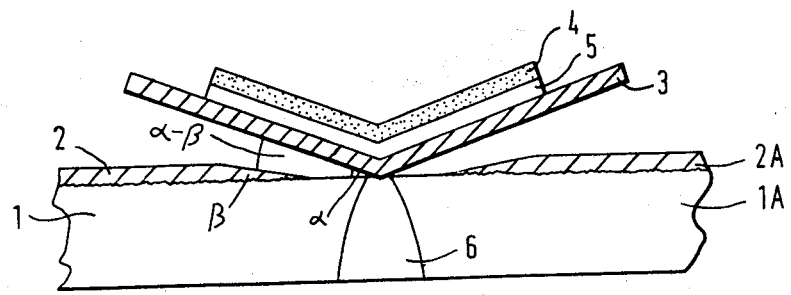

As shown in FIG. 1 a rectangular flyer-plate 3 of cladding material compatible with the cladding layers 2, 2A is bent to a shallow generally 'V' configuration such that each side subtends an angle $\alpha$ and is closely positioned as shown. The sides may meet at an angle or on a radius along the apex. The angles $\alpha$ and $\beta$ are determined on the basis of calculation of the required collision angle which provides the suitable set-up angle $\alpha$-$\beta$ required for explosive welding to take place. The flyer 3 will also be curved in side profile along the weld when the weld is curved or circumferential.

The flyer-plate 3 is covered with a buffer layer 4 comprising a transmitting medium such as rubber and a layer of explosive medium 5 which is preferably a high detonation velocity explosive such as Metabel.

In order to avoid distortion of the base plates 1 and 1A it may be necessary to place the base plates on a matching anvil such as a heavy metal plate which resists the detonation of the explosive.

The explosive medium 5 is detonated in the direction of the fusion weld seam, i.e. perpendicular to the section of the plate shown in FIG. 1. The velocity of the flyer-plate 5 at impact is determined by the explosive loading and detonation velocity of layer 5; the collision angle and collision point velocity are determined by the velocity of the flyer-plate 3 and also by the angle $\alpha$-$\beta$ and may be calculated from a knowledge of the prior art.

Figure 2:
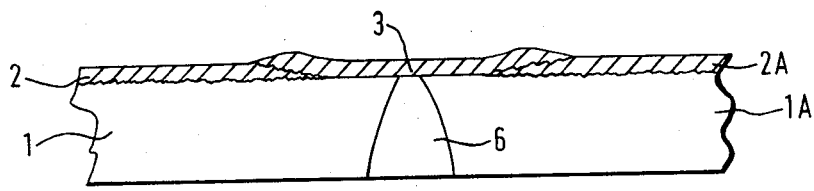
FIG. 2 shows schematically the resultant explosive weld achieved with the arrangement shown in FIG. 1.

The form of the resultant weld after dressing, i.e. removing excess material, is as shown in FIG. 2. No weld occurs centrally, although in certain conditions some welding may take place between the flyer 3 and the base 1, 1A at some distance from the centre, but welding occurs along the sloping portions of the cladding, thereby effectively maintaining the continuity of the cladding across the joint region.

The arrangement described above with reference to FIGS. 1 and 2 is suitable when the weld zone width is small. However, when the weld zone is wider the embodiment illustrated in FIGS. 3 and 4 may be employed.

Figure 3:
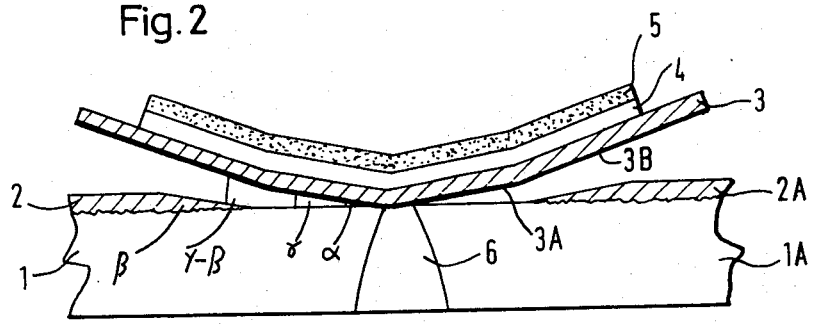
FIG. 3 shows a diagrammatic cross-section of an alternative embodiment in accordance with the invention.
Figure 4:
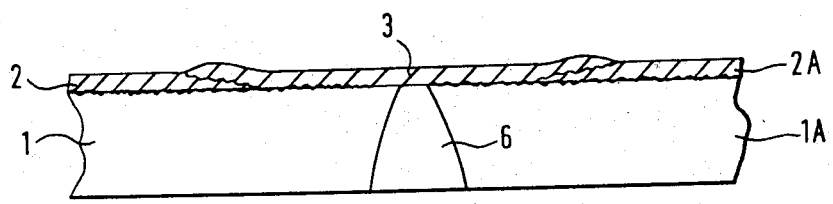
FIG. 4 shows schematically the resultant explosive weld achieved with the arrangement shown in FIG. 3.

Thus as shown in FIG. 3 the extent of welding may be increased by forming an additional inclined portion 3B having an inclination of angle $\gamma$ to the target or base layers, 1, 1A so that inclined portion 3A form an angle $\alpha$ with the base 1, 1A and the portion 3B form a resultant angle $\gamma$-$\beta$ with the chamfers on the clad layers 2, 2A. The resultant weld after dressing is shown schematically in FIG. 4 and it will be seen that welding of the flyer occurs right across the joint surface except for a narrow central region, due to the normal impact and the low stand-off.

Figure 5:
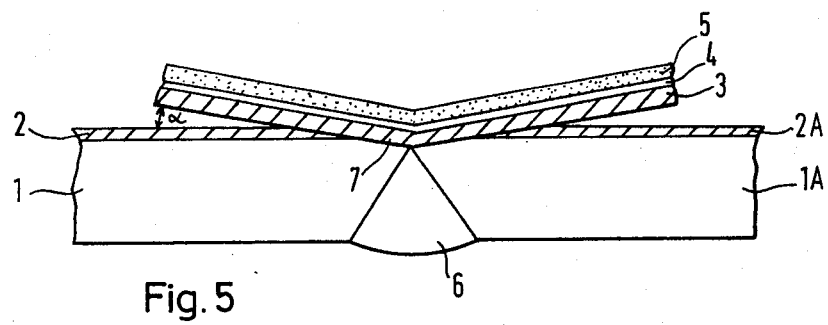
FIG. 5 shows a diagrammatic cross-section of a further embodiment in accordance with the invention.

In the arrangement shown in FIG. 5 the edges of the cladding layers 2, and 2A and the portion of the base 1 and 1A adjacent to the weld 6 are machined at a chamfer angle $\alpha$ thereby forming a groove 7 above the weld 6, the angle $\alpha$ being the appropriately chosen welding angle. The flyer 3, with its sides including an angle $180° - 2\alpha$ is positioned with its apex in register in the groove 7.

Figure 6:
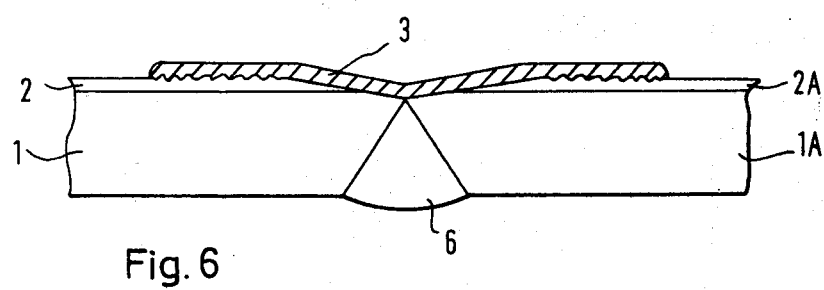
FIG. 6 shows schematically the resultant explosive weld achieved with the arrangement shown in FIGS. 5 and 5A.

On detonation of the explosive layer 5 the flyer is welded to the upper surface of the cladding layer 2, 2A as shown in FIG. 6.

Figure 5A:
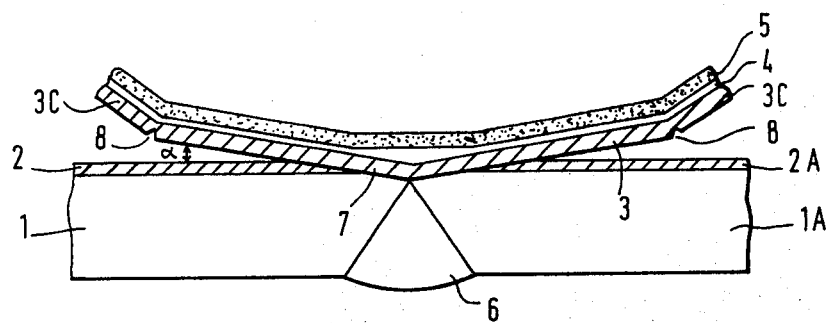
FIG. 5A is a modification of the embodiment of FIG. 5.

In the modified assembly of FIG. 5A the flyer plate 3 advantageously has integral extensions 3C which can be coplanar with the flyer plate or bent upwards as shown. In addition the flyer plate 3 has longitudinal grooves 8 at the commencement of the extensions.

The buffer layer 4 and the explosive layer 5 covers all the area of flyer plate 3 and extensions 3C. The buffer layer 4 may also be locally thickened in the area immediately over the weld 6 for increased protection of the flyer plate in the region of the weld.

On detonation of the explosive layer 5 the extensions 3C become detached and the flyer is welded to the upper surface of the cladding layer 2, 2A, as shown in FIG. 6, the extension promoting welds of high quality up to the flyer plate edge.

The invention described above has the following advantages:

The flyer or cladding plate 3 may be pre-formed with the buffer layer 4 and explosive charge layer 5 prior to welding and simple end jigs may be employed to maintain the required set-up geometry prior to detonation of the explosive layer.

Welding may be performed on curved seams by using shaped (curved) flyers, provided that the correct relative angles are maintained. However, final closure of a full circumferential weld may not be achieved because of pressure doubling and overlap effects and therefore final closure of a small region only may require the more complex fusion welding technique to be employed.

The method in accordance with the invention is applicable to seams lying in any direction or orientation, e.g. vertical, horizontal, overhead or downhand.

Explosives whose detonation velocity fall within a wide range are suitable. However, plastic explosives, such as Metabel which has a high detonation velocity, are preferred mainly on the grounds that they are readily moulded to shape and will stay in position without further packaging being required.

It should also be noted that an explosively welded seam can readily be inspected by ultrasonic techniques which are not applicable to fusion welded seams.

We claim:

1. A method of applying a surface layer across a gap between cladding layer edges on a clad metal plate comprising forming a shallow chamfer along each opposing cladding layer edge, forming a groove in the metal plate centrally between the chamfer edges of the cladding layers and positioning in the groove and over the said chamfers a corrosion resistant metal flyer-plate having a shallow generally V-shaped configuration with the apex of the flyer plate facing the clad metal plate and lying between and generally parallel to the cladding layer edges, superimposing an explosive layer upon the cladding layer and detonating the explosive layer so as to weld the flyer-plate material at least to the cladding layers on each side of the gap.

2. A method as claimed in claim 1 including applying a buffer layer of transmitting medium between the flyer-plate and the explosive layer.

3. A method as claimed in claim 1 wherein the groove effectively extends the chamfer surfaces of the cladding layers.

4. A method as claimed in claim 3 wherein the groove is formed simultaneously with the chamfers of the cladding layers.

5. A method as claimed in claim 1 wherein a surface layer is applied to a joint region of clad metal plates where two base metal plates have been fusion welded together.

6. A method as claimed in claim 1 wherein each leg of the flyer-plate is provided with a pair of angled portions to provide for a partial weld to occur to the base metal plate as well as to the cladding portions.

7. A method as claimed in claim 1 wherein the flyer-plate is spaced apart from the base metal plate.

8. A method as claimed in claim 1 wherein the explosive layer comprises a plastic explosive.

9. A method as claimed in claim 7 wherein the explosive is in the form of a flexible sheet.

10. A method as claimed in claim 7 wherein the explosive has a high detonation velocity.

11. A method of applying a surface layer across a gap between cladding layer edges on a clad metal plate comprising forming a shallow chamfer along each opposing cladding layer edge and positioning over the said chamfers a corrosion resistant metal flyer-plate having a shallow generally V-shaped configuration with the apex of the flyer plate facing the clad metal plate and lying between and generally parallel to the cladding layer edges, the flyer plate also having at least one integral extension, superimposing an explosive layer upon the cladding layer and detonating the explosive layer so as to weld the flyer-plate material at least to the cladding layers on each side of the gap and so as to detach the extension thereby promoting welds up to the flyer plate edge.

12. A method as claimed in claim 11 wherein the extension is defined by a longitudinal groove formed at the commencement of the extension.

13. A method as claimed in claim 11 wherein the extension is defined by bending the extended flyer-plate along a line at the commencement of the extension in a direction outwardly from the base plate.

* * * * *